(12) United States Patent
Ohkubo et al.

(10) Patent No.: US 8,314,938 B2
(45) Date of Patent: Nov. 20, 2012

(54) METHOD AND APPARATUS FOR MEASURING SURFACE PROFILE OF AN OBJECT

(75) Inventors: Akinori Ohkubo, Tucson, AZ (US); Yasuyuki Unno, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/848,001

(22) Filed: Jul. 30, 2010

(65) Prior Publication Data

US 2012/0026511 A1 Feb. 2, 2012

(51) Int. Cl.
*G01B 11/02* (2006.01)
(52) U.S. Cl. .......................... 356/601; 356/609; 356/511
(58) Field of Classification Search .......... 356/601–626, 356/511, 512; 250/559.22, 559.23, 216
See application file for complete search history.

(56) References Cited

U.S. PATENT DOCUMENTS

| | | | |
|---|---|---|---|
| 5,694,220 A * | 12/1997 | Ooki et al. ..................... | 356/601 |
| 5,764,363 A | 6/1998 | Ooki et al. | |
| RE36,560 E * | 2/2000 | Svetkoff et al. .............. | 356/608 |
| 6,208,416 B1 * | 3/2001 | Huntley et al. ............... | 356/606 |
| 6,489,984 B1 * | 12/2002 | Johnson ........................ | 347/239 |
| 6,657,216 B1 * | 12/2003 | Poris ........................ | 250/559.22 |
| 7,362,687 B2 * | 4/2008 | Tsukagoshi .................... | 369/103 |
| 7,583,392 B2 * | 9/2009 | Huang ........................... | 356/601 |
| 2004/0109170 A1 * | 6/2004 | Schick ........................... | 356/614 |
| 2008/0024793 A1 | 1/2008 | Gladnick | |
| 2009/0161519 A1 * | 6/2009 | Yamamoto et al. ........... | 369/103 |
| 2010/0059490 A1 * | 3/2010 | Unrath et al. ............ | 219/121.73 |
| 2010/0188742 A1 * | 7/2010 | Chen et al. .................... | 359/385 |
| 2010/0277779 A1 * | 11/2010 | Futterer et al. .................... | 359/9 |

OTHER PUBLICATIONS

Masajada, Jan, et al., "Micro-Step Localization Using Double Charge Optical Vortex Interferometer", Optics Express, Aug. 31, 2009, vol. 17 No. 18, USA.
Spektor, Boris, et al. "Experimental validation of 20nm sensitivity of Singular Beam Microscopy", Optical Measurement Systems for Industrial Inspection V, 2007, SPIE vol. 6616, USA.
Spektor, Boris, et al. "Singular Beam Microscopy", Applied Optics, Feb. 2008, vol. 47 No. 4, USA.

* cited by examiner

*Primary Examiner* — Hoa Pham
(74) *Attorney, Agent, or Firm* — Canon USA Inc IP Division

(57) ABSTRACT

A method for measuring a surface profile of an object, the method includes, acquiring information about a first direction where a step of a surface of the object extends relative to a scanning direction, setting phase distribution applied to the irradiation beam according to the information, and scanning the object in the scanning direction with the irradiation beam.

16 Claims, 19 Drawing Sheets

METHOD AND APPARATUS FOR MEASURING SURFACE PROFILE OF AN OBJECT

BACKGROUND OF THE INVENTION

1. Field of the Invention

The present invention relates to a method and an apparatus for measuring a surface profile of an object.

2. Description of the Related Art

A surface profiler with an optical probe and a scanning system is used for measurement of a surface profile of an object.

An optical probe system 1100 as an optical surface profiler is illustrated in FIG. 1. The optical probe system executes a measurement called "confocal method" using a focusing spot. The laser beam emitted from a laser diode 1000 is collimated by a collimator lens 1001, and focused onto an object surface 1050 by a focusing lens 1005 via a Polarization Beam Splitter (PBS) 1002, a Quarter Wave Plate (QWP) 1003, and a focus shift device 1004. The reflected light from the object surface 1050 is focused by an imaging lens 1006 via the PBS 1002. When a pinhole board 1007 having a pinhole is conjugate to the object surface 1050, intensity detected by a detector 1008 may become a maximum. Changing the focal length using the focus shift device 1004, a length L is calculated by the focal length which has maximum intensity on the detector 1008. To obtain the surface profile, the optical probe system 1100 should scan the surface of the object 1050.

With the confocal method described above, a pitch of current diffractive optics such as diffractive grating and diffractive lens becomes less than 10 microns. The lateral resolution of this method is limited by the focused spot size, and typical size of a focused spot to be used for optical probe is approximately 1 micron. Therefore, the measurement results of surface profile near an edge (step) becomes inaccurate.

Accordingly, there is a need for a method for measuring a surface profile of an object which can more accurately obtain a measurement result of a surface profile near an edge.

SUMMARY OF THE INVENTION

According to an aspect of the present invention, a method for measuring a surface profile of an object includes: acquiring information about a first direction where a step of a surface of the object extends relative to a scanning direction, setting phase distribution applied to the irradiation beam according to the information, and scanning the object in the scanning direction with the irradiation beam.

According to another aspect of the present invention, an apparatus for measuring a surface profile of an object includes: an optical source, a spatial light modulator configured to apply phase distribution to light irradiated from the optical source, a scanning unit configured to scan the object, a detector configured to detect a reflected light from the object, and a controller configured to control the spatial light modulator according to a first direction where a step of a surface of the object extends relative to a scanning direction of the scanning unit.

DESCRIPTION OF THE EMBODIMENTS

Embodiments according to the present invention will be described below with reference to the attached drawings.

Figure 1:
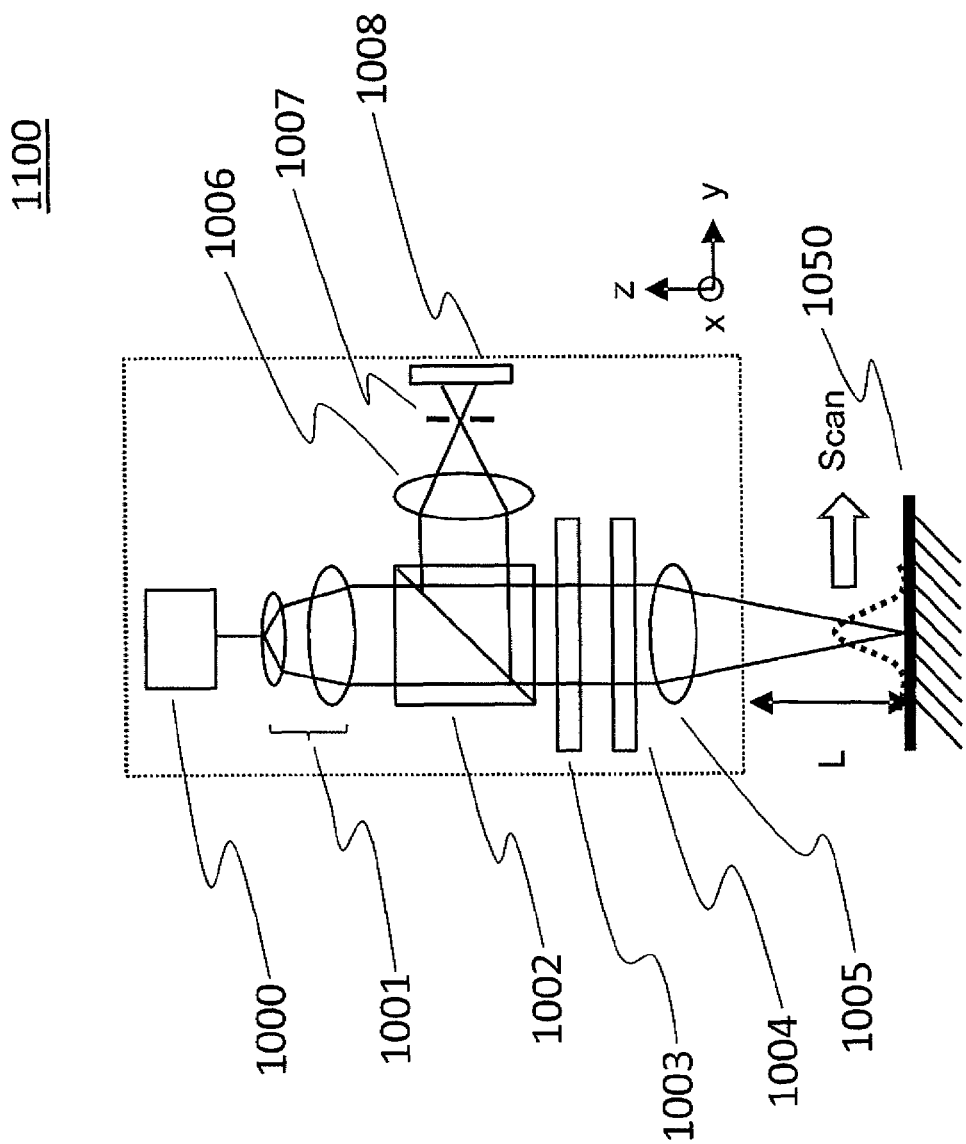
FIG. 1 illustrates an optical surface profiler.
Figure 2:
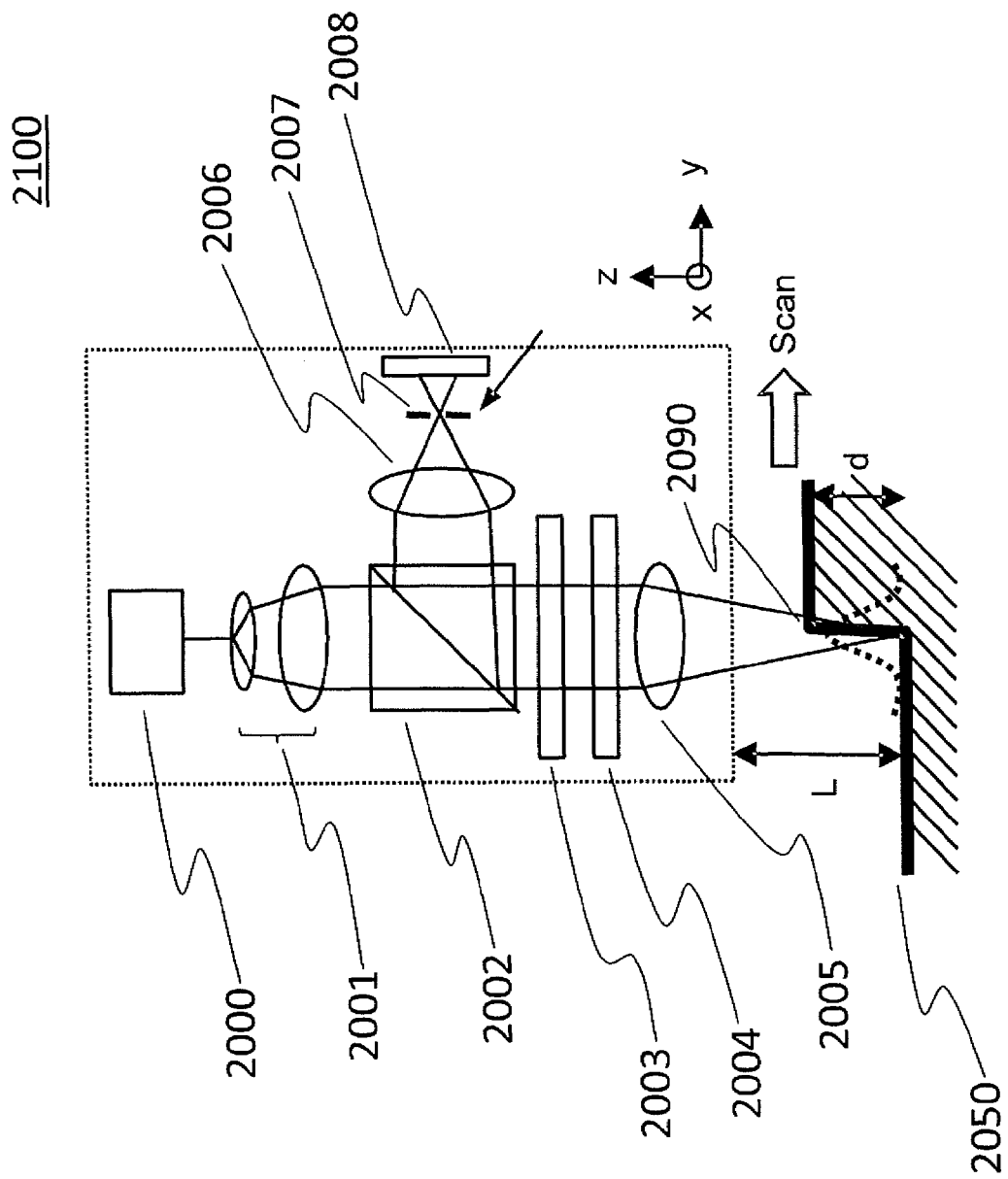
FIG. 2 illustrates an optical surface profiler.

FIG. 2 illustrates an optical probe system 2100. In the optical probe system shown in FIG. 2, a spot, which formed on an object surface 2050 by a focused irradiation beam, is located at an edge portion 2090 of a step. The optical probe system 2100 includes a laser diode 2000, collimator lens 2001, a PBS 2002, a QWP 2003, a focus shift device 2004, a focusing lens 2005, an imaging lens 2006, a pinhole board 2007, and a detector 2008. Using the confocal method, the shape of the object surface 2050 can be measured.

Figure 3:
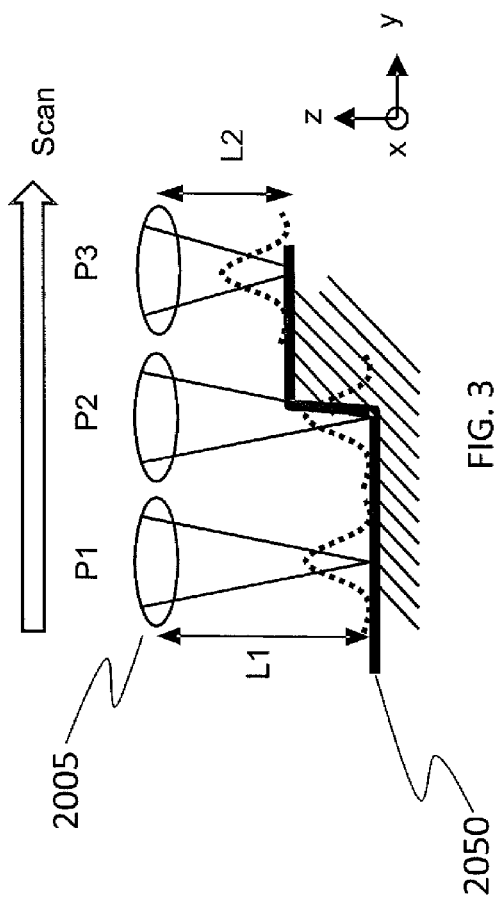
FIG. 3 illustrates positions of focusing lenses to a step.

The position of the focusing lens 2005 can be changed from P1 to P3 as illustrated in FIG. 3. As illustrated in FIG. 3, P1 indicates the position where a distance from the focusing lens 2005 to the object surface 2050 is L1, P2 indicates the position where the spot is located on the edge portion of the step and P3 indicates the position where a distance from the focusing lens 2005 to the object surface 2050 is L2.

Figure 4:
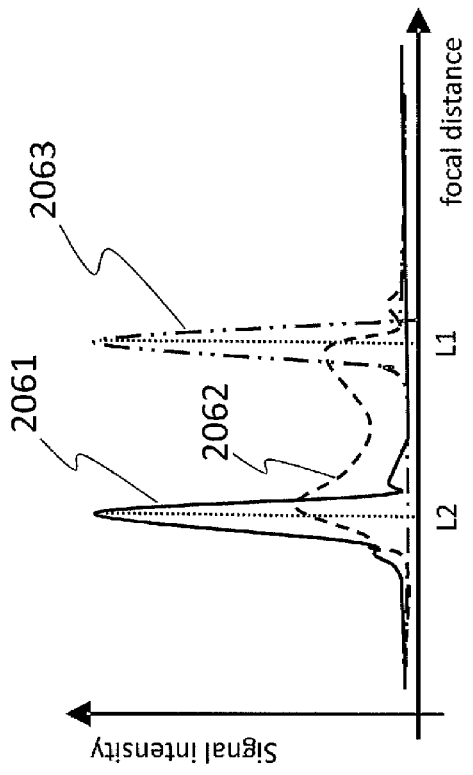
FIG. 4 illustrates signal intensity received by a detector.

FIG. 4 illustrates the change of the signal of the detector 2008 when the focal distance is changed by the focus shift device 2004 at the each position of the focusing lens 2005. A solid line 2061, a broken line 2062, and a dash-dotted line 2063 illustrate the signals at the position P3, P2, and P1, respectively. The signal of the detector becomes a maximum when the focusing spot is located on the object surface 2050, because light quantity penetrating the pinhole plate 2007 becomes a maximum.

Figure 5:
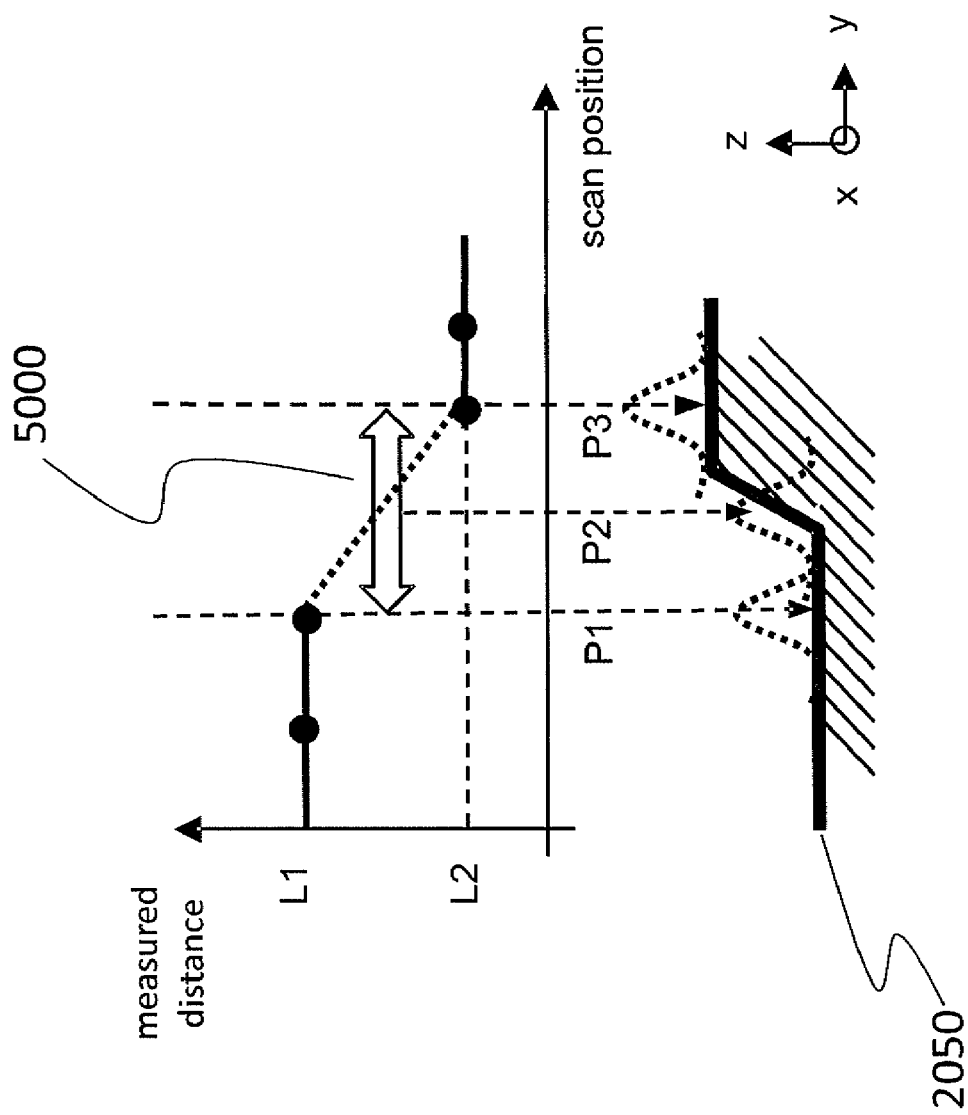
FIG. 5 illustrates measured distance at each focusing position.

The focal distance where the signal becomes a maximum is equivalent to the distance between the focusing lens 2005 and the object surface 2050. When the focusing spot is located at P1, the signal intensity becomes a maximum in the focal distance of L1, and when the spot is located at P3, the signal intensity becomes a maximum in L2 as illustrated in FIG. 4. However, when the focusing spot is located at P2, it may be difficult to decide the distance where the signal intensity becomes a maximum because the spot can cover both of the object surfaces whose focal distances are L1 and L2. As illustrated in FIG. 5, to measure the focal distance correctly within a range 5000, especially at a position of a step, may be difficult due to the scattering of the irradiation beam at the edge of the step.

A singular beam spot has been studied to solve the difficulty as shown in Boris Spektor, Alexander Normatov, and Joseph Shamir, "Singular beam microscopy," Appl. Opt. 47, A78-A87 (2008).

Figure 7:
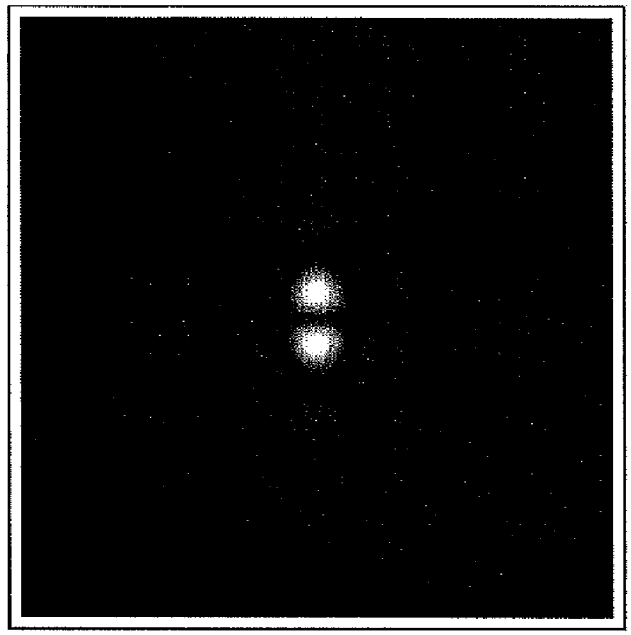
FIG. 7 illustrates intensity distribution of a focusing spot.
Figure 6:
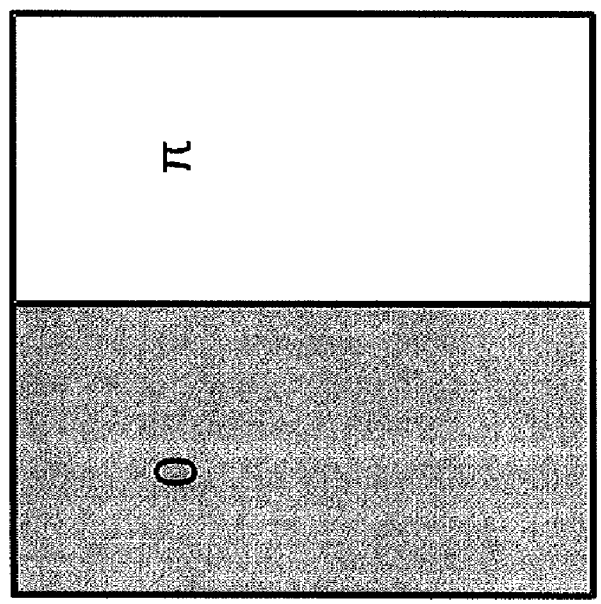
FIG. 6 illustrates a phase distribution.
Figure 8:
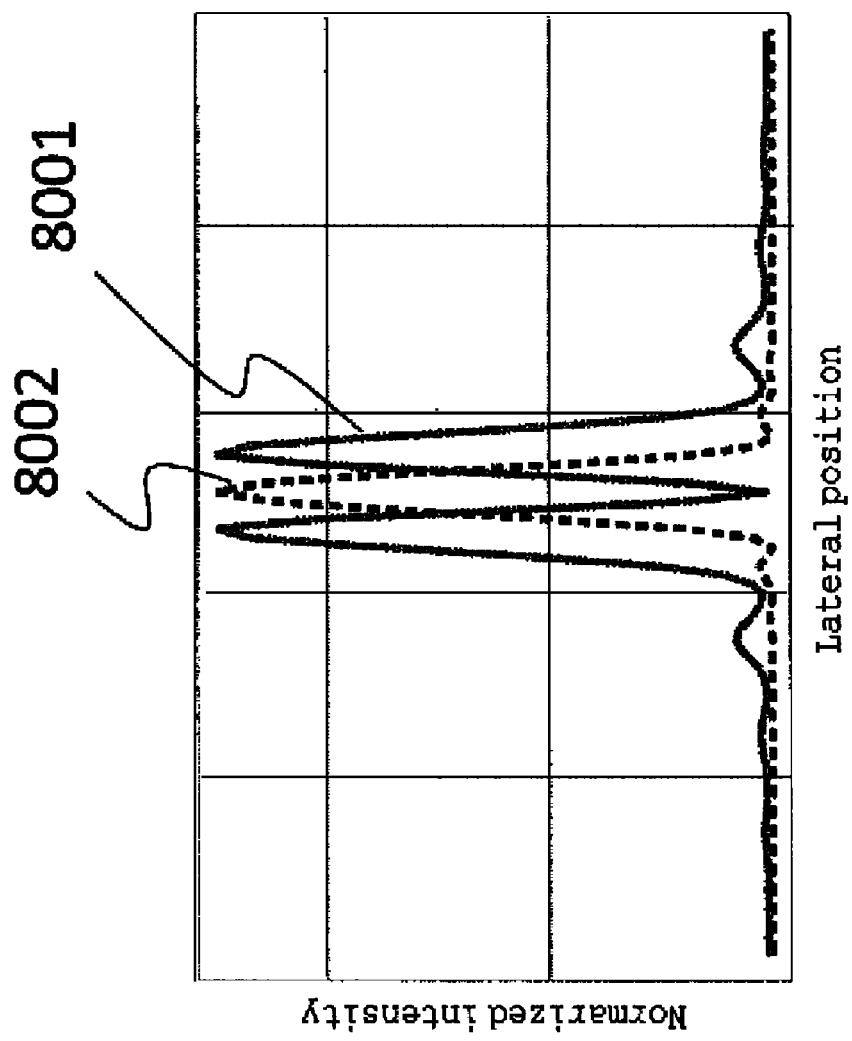
FIG. 8 illustrates sectional intensity distribution of a focusing spot.

When the phase distribution of 0 and pi (rad.) shown in FIG. 6 is applied to an irradiation beam, the intensity distribution of the focusing spot on the pupil plane is shown in FIG. 7. The sectional intensity distribution of the spot is indicated by a solid line 8001 in FIG. 8. In FIG. 8, the horizontal axis is a lateral position, and the vertical axis is normalized intensity. The broken line 8002 in FIG. 8 indicates intensity distribution of an irradiation beam without the phase distribution.

Figure 9:
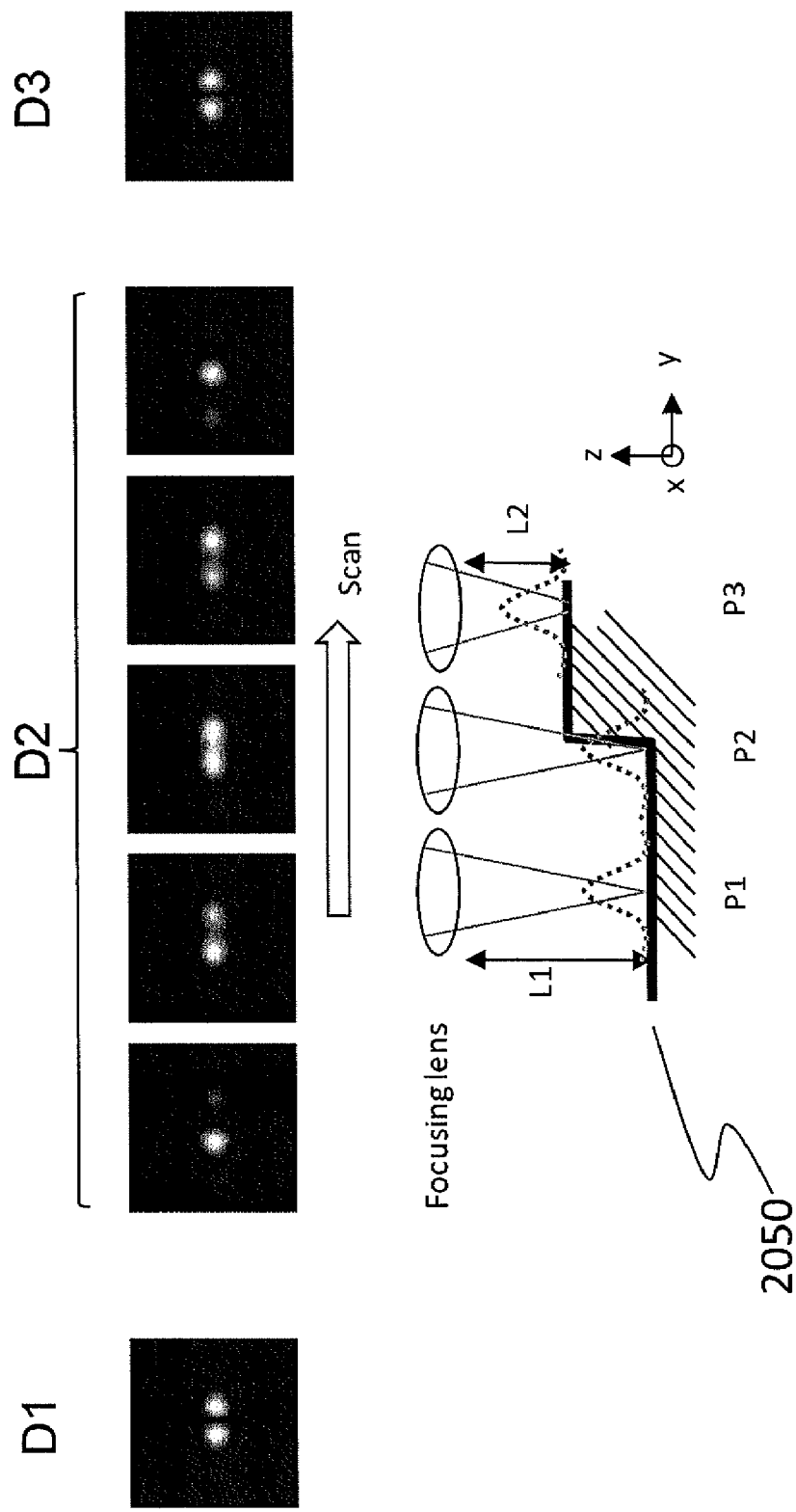
FIG. 9 illustrates detector images.
Figure 10B:
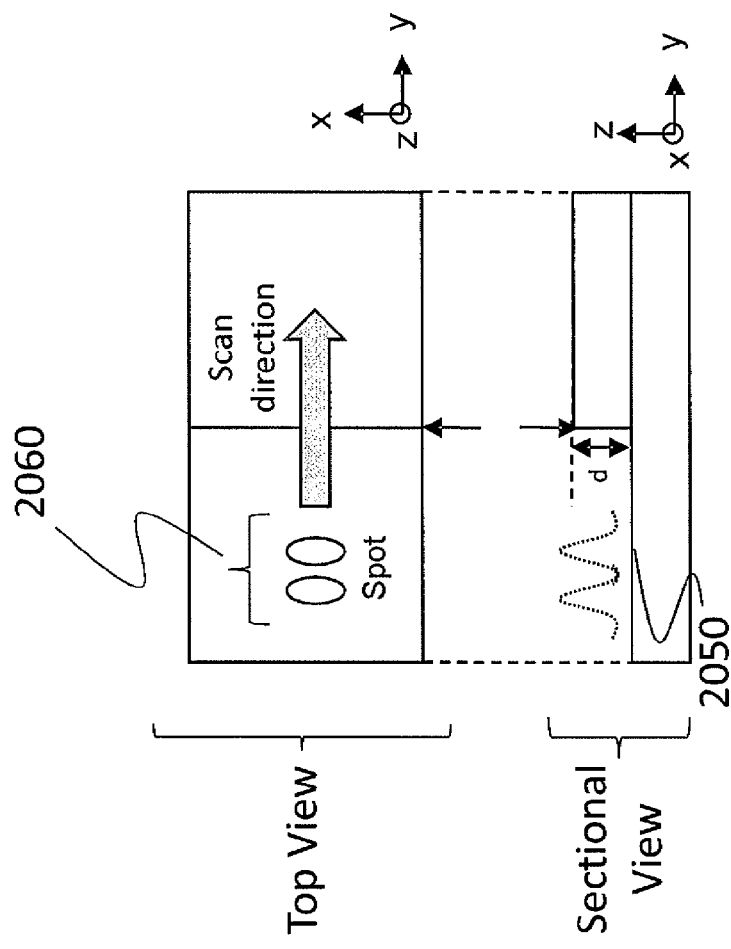
FIG. 10B illustrates top and sectional views of an object.
Figure 10A:
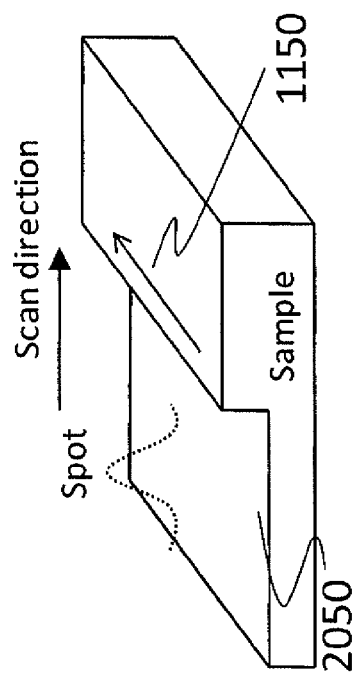
FIG. 10A illustrates a perspective view of an object.

Detector images, detected by a detector, are shown in FIG. 9 when the irradiation beam to which the phase distribution is applied scans the object surface 2050 across the step in the y-direction. When the focusing position is located at P1, P2 and P3, the obtained detector images are D1, D2, and D3, respectively. Following the change of the detector image, information about the surface profile, such as height, of the object can be acquired. A perspective view of the object is shown in FIG. 10A, and top and sectional views of it are shown in FIG. 10B, when the scanning direction of the irradiation beam is perpendicular to a direction where the step of the object surface extends. An arrow 1150 in FIG. 10A indicates the direction where the step extends. The focusing spot 2060 on the object surface 2050 is illustrated in FIG. 10B.

Figure 11:
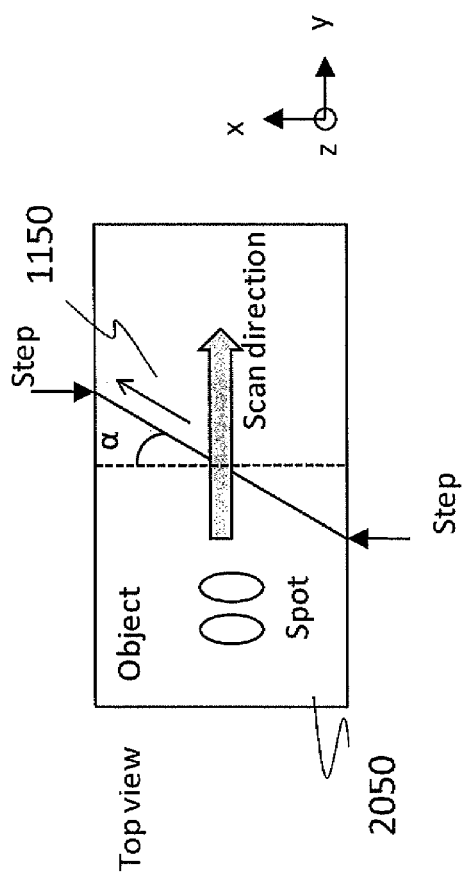
FIG. 11 illustrates the top view of the object surface.
Figure 12:
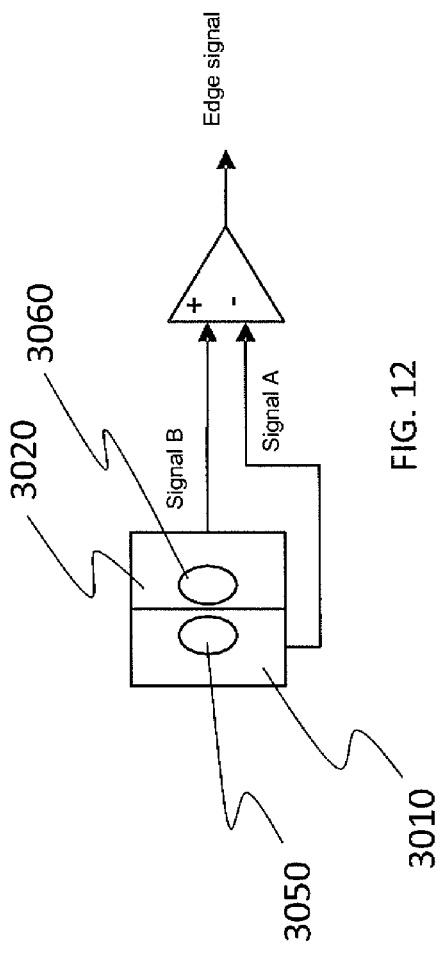
FIG. 12 illustrates a detector image.

However, there is a possibility that the scanning direction is not perpendicular to the direction 1150 where the step of the object surface extends as shown in FIG. 11. The detector image can be detected by two detector regions 3010 and 3020 illustrated in FIG. 12. The detector regions 3010 and 3020 can detect the light corresponding to the irradiation spot 3050 and 3060, respectively. Information about the step is obtained by a difference signal between a signal A, which is obtained by the detector region 3010, and a signal B, which is obtained by the detector region 3020. When the height of the step d is 102 nm, a wavelength of the irradiation beam is 408 nm, and NA of the object lens is 0.5, the difference signal is illustrated in FIG. 13.

Figure 13:
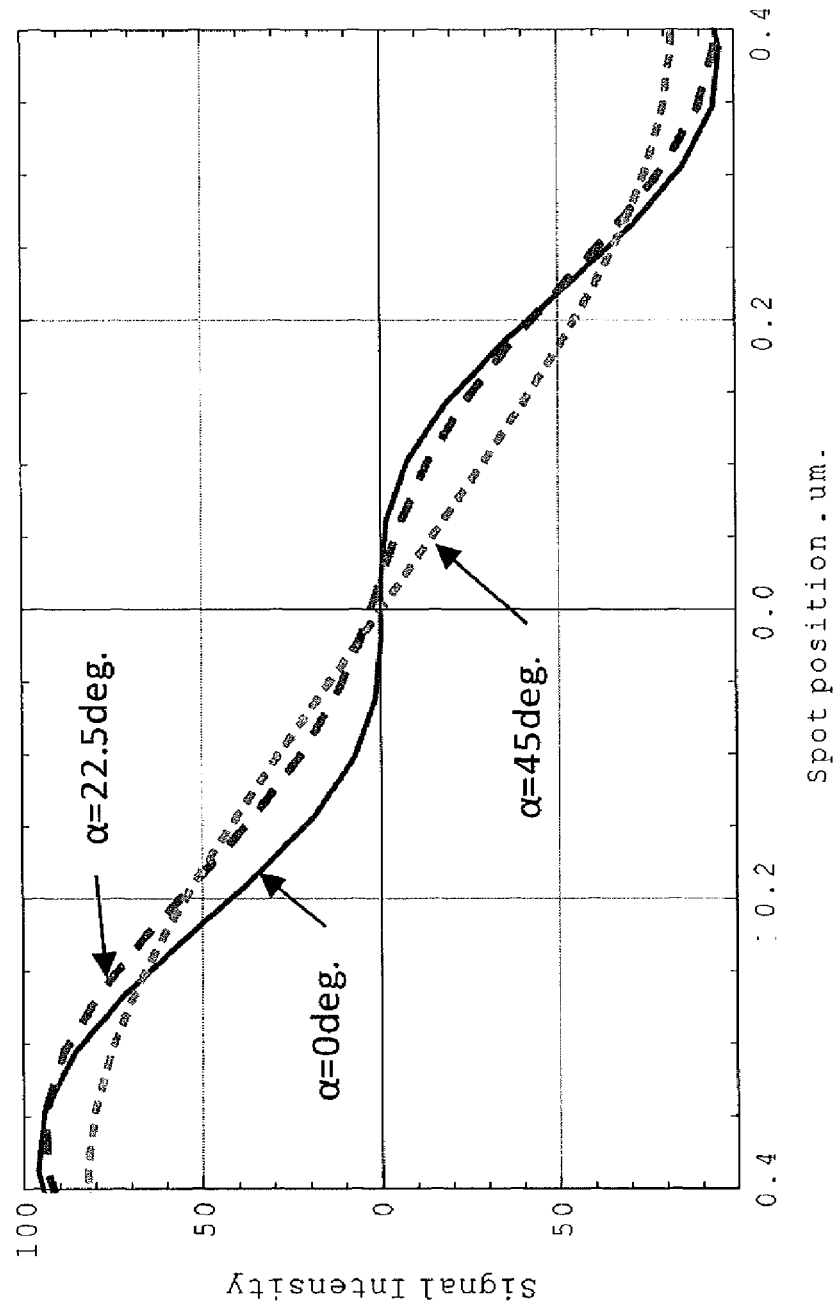
FIG. 13 illustrates signal intensity obtained by a detector.

In FIG. 13, a horizontal axis is a spot position, a vertical axis is signal intensity, and a indicates an angle between the direction where the step of the object surface extends and a direction perpendicular to the scanning direction as shown in FIG. 11. In short, $\alpha=0$ (deg.) means that the scanning direction is perpendicular to the direction where the step of the object surface extends. As shown in FIG. 13, signal intensity in $\alpha=0$ (deg.) is different from the ones in $\alpha=22.5$ (deg.) and $\alpha=45$ (deg.). Therefore, when the scanning direction is not perpendicular to the direction where the step extends, a precise measurement to obtain information about the step, such as height or position of the step, might become difficult.

EMBODIMENT 1

Measuring Method 1

Figure 14B:
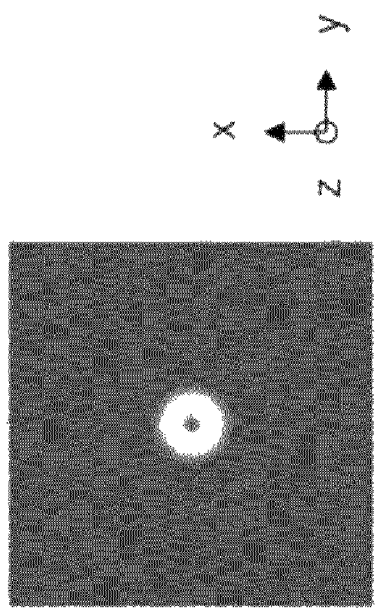
FIG. 14B illustrates a spot shape on a focal plane.
Figure 14A:
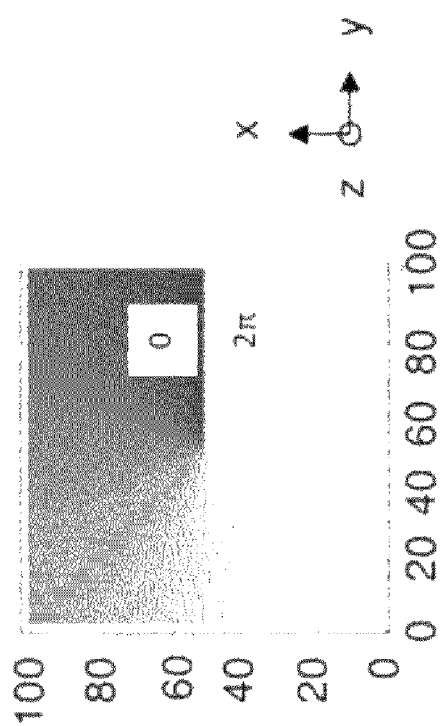
FIG. 14A illustrates a phase pattern.

According to an embodiment of the present invention, a method for measuring a surface profile of an object includes acquiring information about a first direction where a step of a surface of the object extends. The first direction is indicated as the arrow 1150 in FIG. 10A. The information can be acquired by using an irradiation beam having phase distribution. One example of the phase distribution is circumferential phase distribution from 0 to $2\pi$ (rad.), which is formed by a spatial light modulator. A phase pattern of the spatial light modulator is illustrated in FIG. 14A, and a spot shape on a focal plane when the phase pattern is applied to the irradiation beam is illustrated in FIG. 14B.

Figures 15A, 15B, 15C:
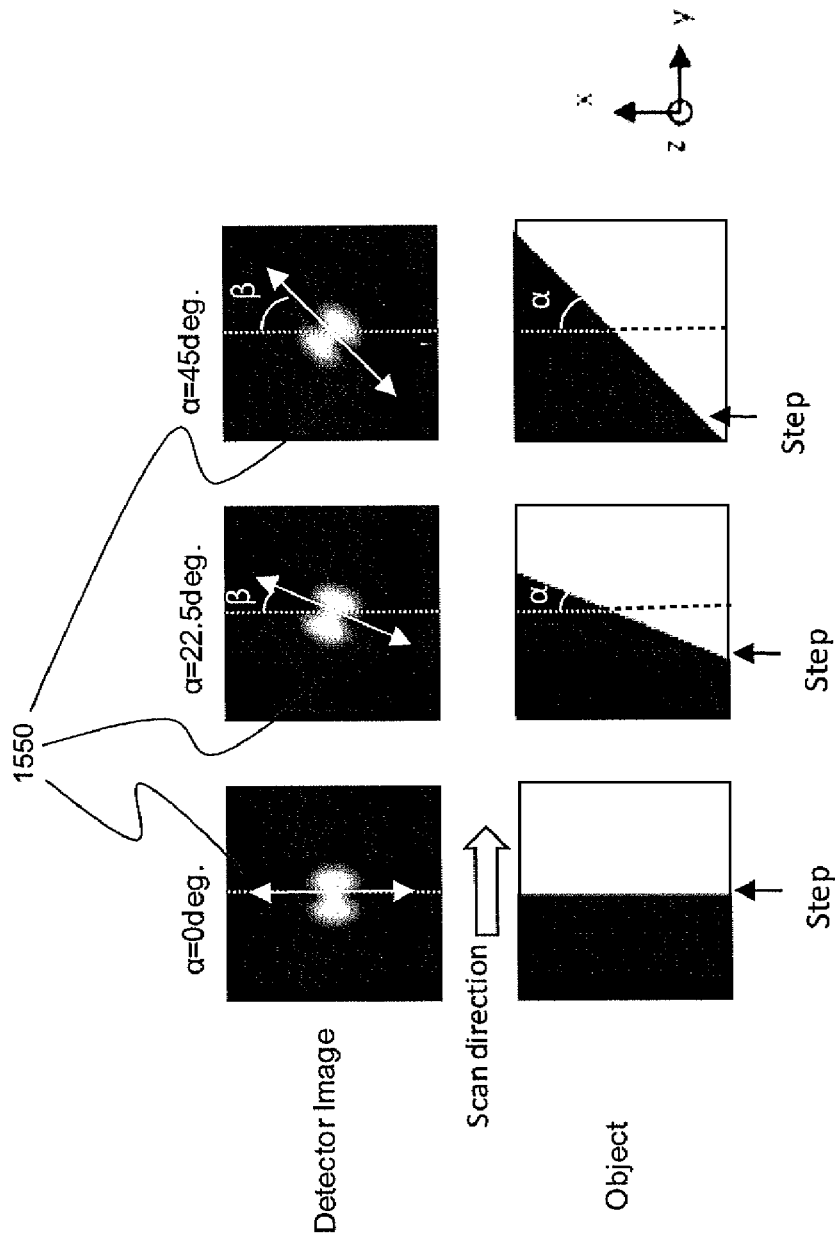
FIG. 15A illustrates a spot shape and a top view of an object surface.
FIG. 15B illustrates a spot shape and a top view of an object surface.
FIG. 15C illustrates a spot shape and a top view of an object surface.
Figure 16:
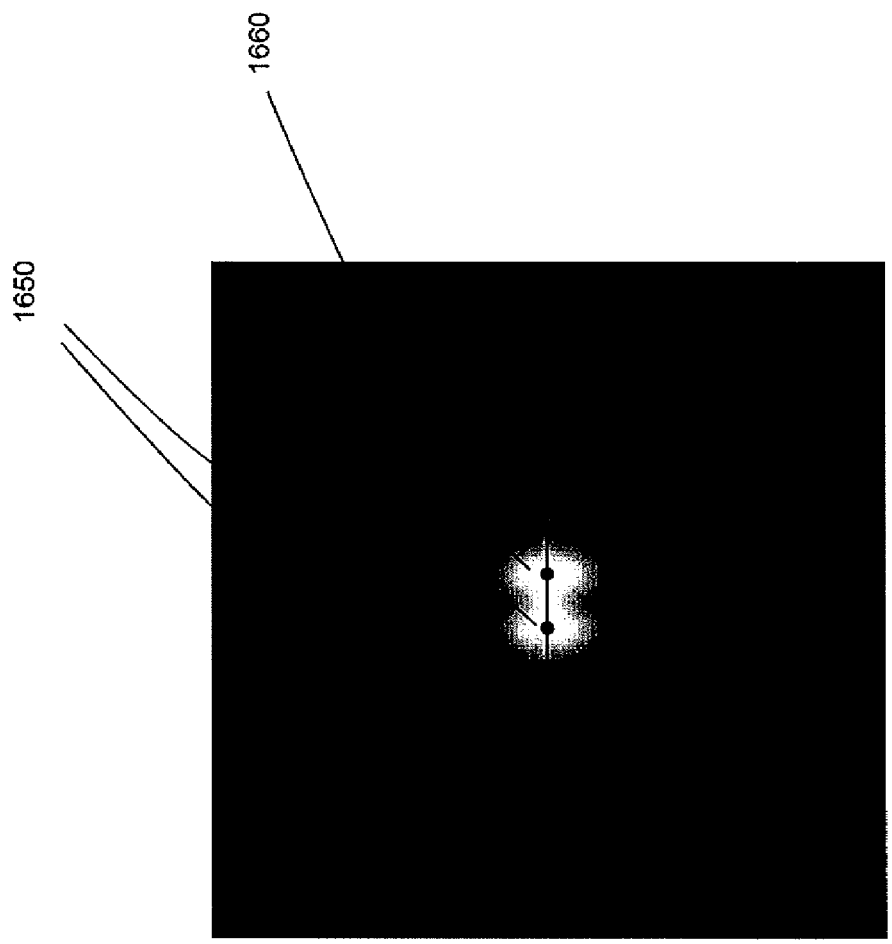
FIG. 16 illustrates a line connecting two points which are two peak intensity portions.

When the first direction is perpendicular to the scan direction (i.e. $\alpha=0$ (deg.)), the shape on the objective surface is illustrated in FIG. 15A. The upper and lower illustrations correspond to the spot shapes (the detector images) and top views of the object surfaces, respectively, in FIGS. 15A, 15B and 15C. A second direction 1550, defined as a direction perpendicular to a line 1660 connecting between two points 1650 which are the two peak intensity portions in the spot as shown in FIG. 16, is corresponding to the first direction 1150. As shown in FIGS. 15B and 15C, the second direction 1550 can correspond to the first direction 1150 of the step, when the first directions of the step are not perpendicular to the scan direction (i.e. $\alpha=22.5$ (deg.), $\alpha=45$ (deg.)), the angle $\beta$ denoted in FIGS. 15B and 15C are 22.5 (deg.) and 45 (deg.), respectively. In other words, acquiring information about the second direction 1550 means acquiring information about the first direction 1150 where the step extends.

Figure 17:
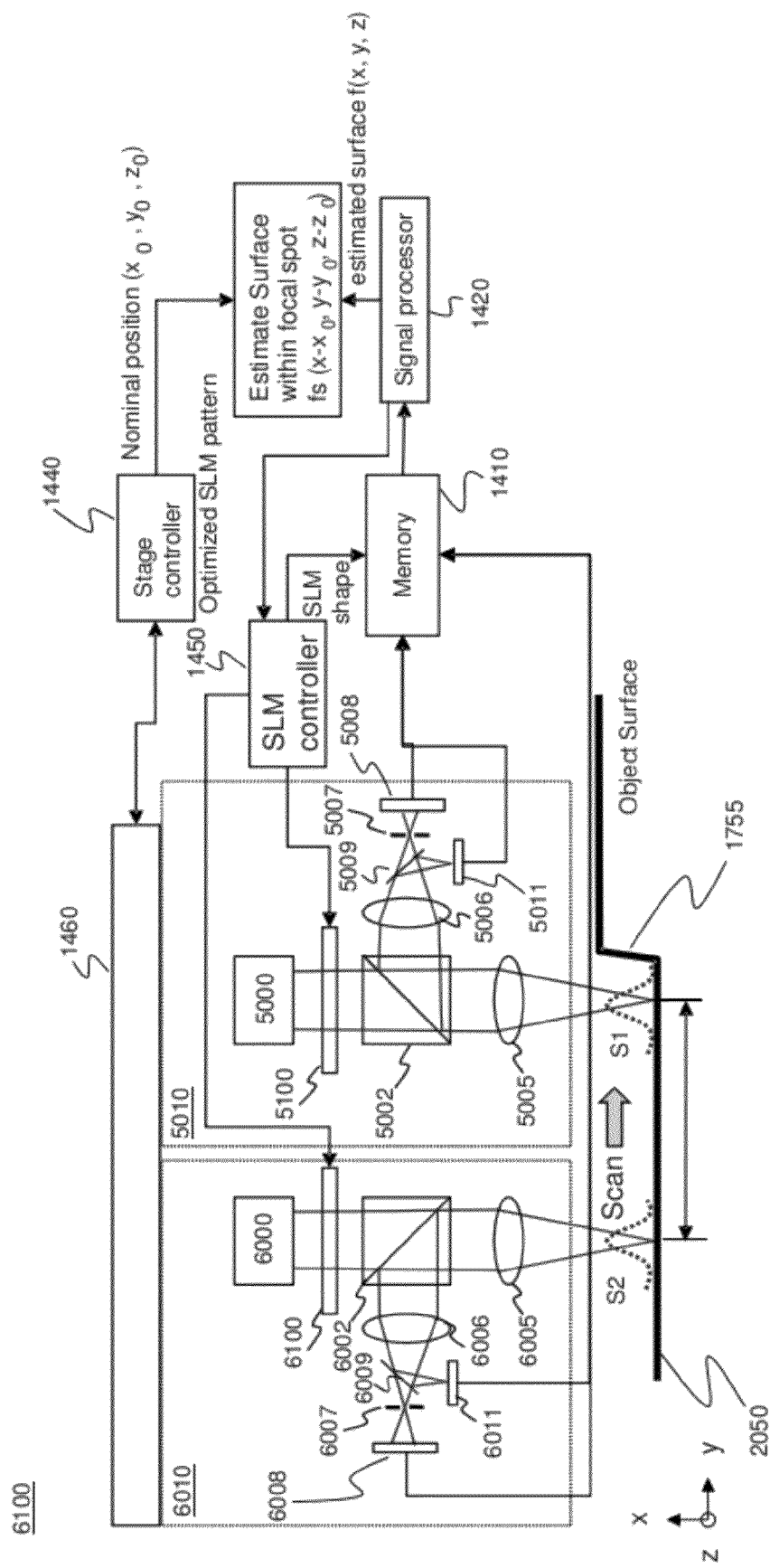
FIG. 17 illustrates a non-contact optical surface profiler.

An exemplary apparatus 6100 for acquiring the information about the first direction is illustrated in FIG. 17.

A non-contact optical surface profiler 6100 includes a first optical probe 5010, a second optical probe 6010, and a stage 1460 as a scanning unit to move the first and second optical probes.

In the first optical probe 5010, an irradiation beam is emitted from a first light source 5000 (a laser diode), and the light irradiates a first spatial light modulator (SLM1) 5100. The SLM1 5100 has a vortex phase pattern which is mentioned above as the circumferential phase distribution. The phase pattern ranges from 0 to $2\pi$ (rad.) as shown in FIG. 14A. An optical phase of the light is modulated by the SLM1 5100, then the light is transmitted through a beam splitter (BS1) 5002. The transmitted light is focused onto an object surface 2050 by a focusing lens (L11) 5005. The focused light produces a first scanning spot S1 which scans the object surface 2050 using the stage 1460.

FIG. 14B shows a spot shape of the first scanning spot S1. The light of the scanning spot S1 is reflected by the object surface 2050 to the beam splitter (BS1) 5002. Then, the reflected light is also reflected by the beam splitter (BS1) 5002 to an imaging lens (L12) 5006. The light is divided into two directions by a beam splitter 5009. The two divided light irradiate a detector (DET11) 5008 and a detector (DET12) 5011, respectively.

A signal from the detector DET11 5008 is transmitted to a signal processor 1420 via a memory 1410. The memory can be included in the signal processor 1420. A distance between the optical probe 5010 and the object surface 2050 is derived from the processed signal using the confocal method. The distance is used for optimization of a distance which produced a focus spot on the object surface. In short, the distance between the optical probe 5010 and the object surface 2050 is adjusted to a distance which is equivalent to a center of dynamic range using the derived distance.

When the first scanning spot S1 is located at an edge of a step 1755 on the object surface 2050, a detector image detected by the detector (DET12) 5011 becomes as shown in FIGS. 15A, 15B, and 15C. The upper illustrations of FIGS.

15A, 15B, and 15C show detector images when the focus spot are located at different object surfaces, respectively. As mentioned above, the detector image has two peaks of intensity, and the line connecting two peaks of detector image is perpendicular to the first direction where the step of the object surface extends. The first direction of the step can be calculated by using the signal from the detector 5011 which is transmitted to the signal processor 1420 via the memory 1410.

A pinhole board 5007 and the detector (DET11) 5008 can be used to set the focus length using the confocal method. When a purpose of the surface profiler 6100 is to obtain only information about the first direction, the following process may be omitted and the second optical probe 6010 may be unnecessary. In other words, when the information about the first direction relative to the scanning direction has been acquired, the measuring process might be terminated.

EMBODIMENT 2

Measuring Method 2 and Apparatus 1

Figure 18:
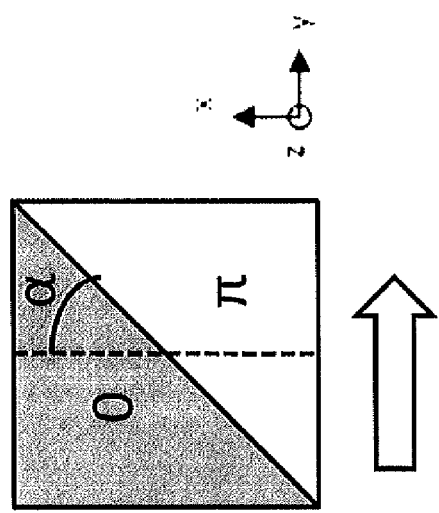
FIG. 18 illustrates an SLM pattern.

After the first direction has been calculated by the signal processor 1420 as described in the first embodiment, the signal processor 1420 can compute an optimized SLM pattern based on the information about the first direction. The SLM pattern is exemplary illustrated in FIG. 18, and the SLM pattern can be divided into two regions corresponding to the first direction. A tilting angle of the boundary between the two regions to a direction perpendicular to the scan direction is α as shown in FIG. 18. Then a SLM controller 1450 controls a SLM2 6100 to the pattern shown in FIG. 18. A second scanning spot S2 is formed by the second optical probe 6010 shown in FIG. 17 in the same manner as the first optical probe 5010. An optical source 6000, a beam splitter 6002, focusing lenses 6005 and 6006, a beam splitter 6009, detectors 6011 and 6008, and a pinhole board 6007 are illustrated. The optical source 5000 of the first optical probe 5010 can be used as a source for the second probe 6010. Both of the optical probes can be moved by the stage controller 1440. The surface profiler 6100 obtains information about the object surface base on the information about the position of the second optical probe and the change of the spot shape. The signal processor 1420 can estimate the surface of the object.

Figure 20:
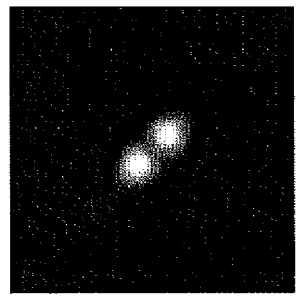
FIG. 20 illustrates a detector image.
Figure 19:
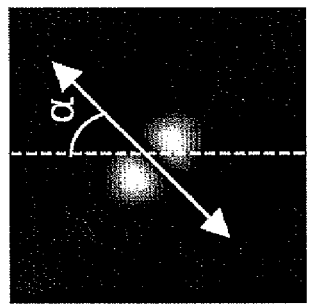
FIG. 19 illustrates a scanning spot.

The second scanning spot S2 is shown in FIG. 19. In this condition, 0th order light forms the second scanning spot, and the spot has two peaks of intensity. A detector image is also shown in FIG. 20. The detector image corresponds to the image shown in FIG. 19. The second direction is derived as a line perpendicular to the line connecting two peaks of the detector image in FIG. 20.

Figure 21:
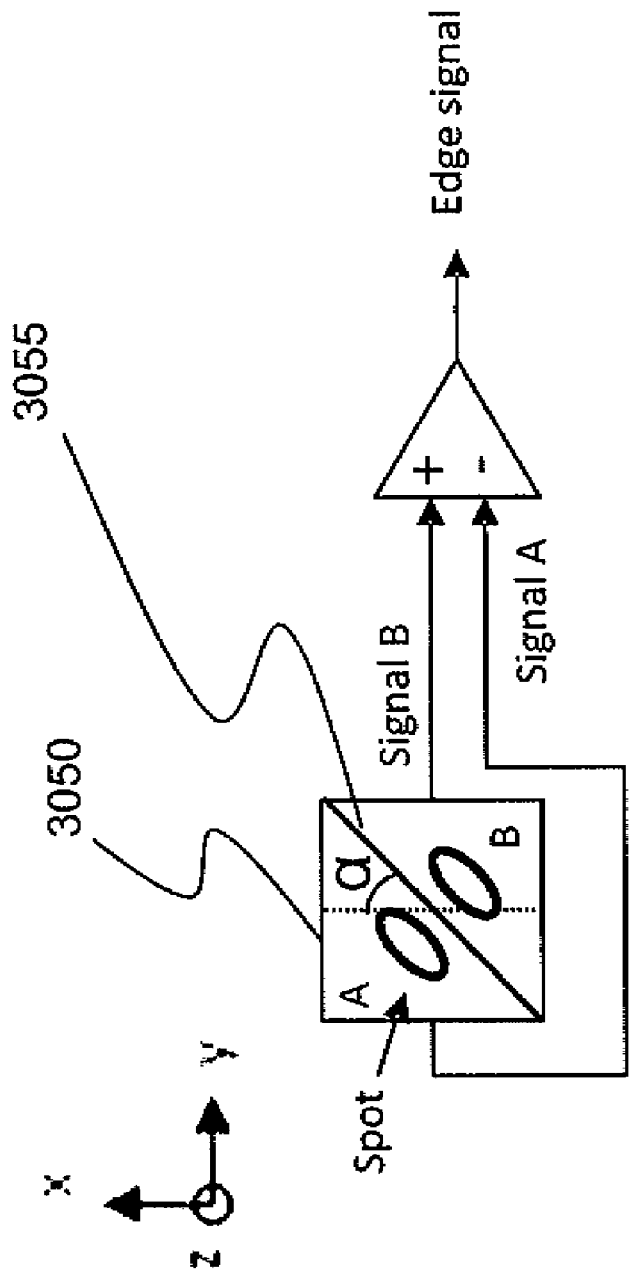
FIG. 21 illustrates a method of calculating an edge signal.

An example of a method of calculating an edge signal is shown in FIG. 21. The scan can be executed along y-direction. When the detector area 3050 can be divided into A and B regions whose boundary 3055 has a tilting angle of α to the y-axis, the edge signal can become substantially similar to an edge signal of the solid line, which is a case of α=0 (deg.), in FIG. 13. When the detector with two regions A and B is used, a scale of scan position in FIG. 13 becomes cos α×(scan position), but the scale can be calibrated by taking a coefficient cos α in the signal processor 1420.

In other words, by dividing the detector into the two regions based on the information about the first direction and obtaining the difference between the signals detected by each of the regions, the signal similar to a signal where the scan direction is perpendicular to the first direction can be obtained while maintaining the scan direction (y-direction). Therefore, a precise measurement of the step about the height or the surface profile can be realized.

Figure 23:
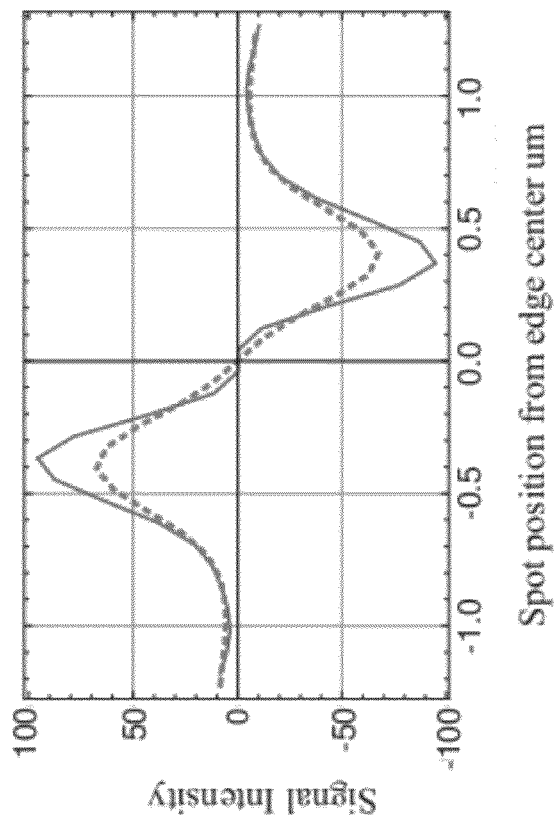
FIG. 23 illustrates signal intensity.
Figure 22:
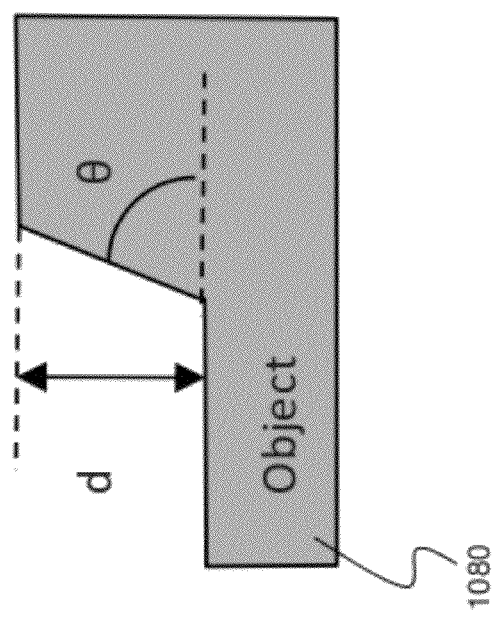
FIG. 22 illustrates a sectional view of an object.

As to the step shape of the object 1080, d and θ are defined as shown in FIG. 22. In FIG. 23, a solid line is for d=200 (nm) and θ=51.3 (deg.), and the dashed line is for d=200 (nm) and θ=11.8 (deg.). It is shown that the edge signal can be changed according to the angle θ of the step. And the height d of the step can be estimated from a peak value of the signal using an estimation method such as a maximum likelihood estimation method. The maximum likelihood estimation is a method which estimates most likelihood surface profile from the detector image. The signal processor 1420 can process this estimation.

A CCD image sensor or a CMOS image sensor can be used as the detector 3050.

Figure 24:
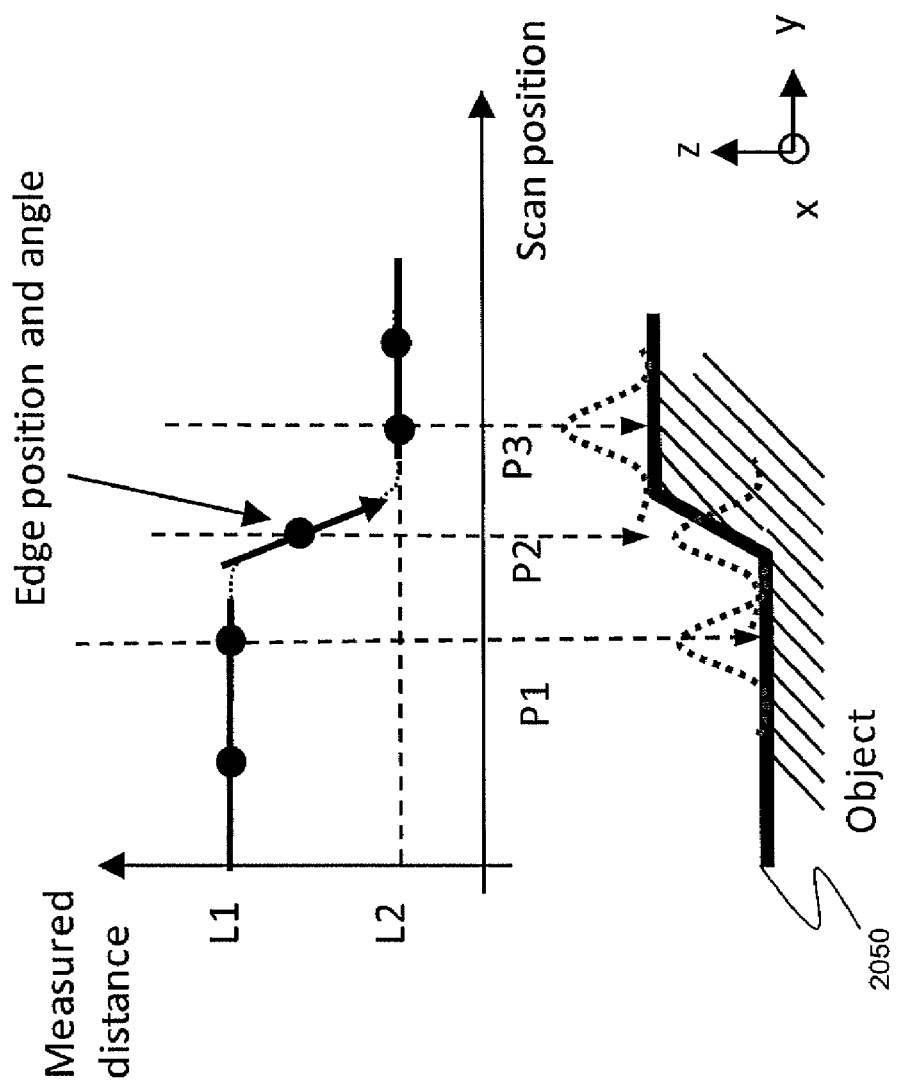
FIG. 24 illustrates measured distance at each focusing position.

This method can measure not only the position of the edge but the angle of the step shown in FIG. 24. Therefore, high resolution information of the surface shape can be measured.

When the first direction of the object surface is previously recognized or input by a user, a scanning process to obtain the first direction can be omitted in the second embodiment. After setting the phase distribution applied to the irradiation beam, the object surface can be scanned with the set irradiation beam. In scanning, the set irradiation beam can be moved relative to the surface of the object.

EMBODIMENT 3

Measuring Apparatus 2

Figure 25:
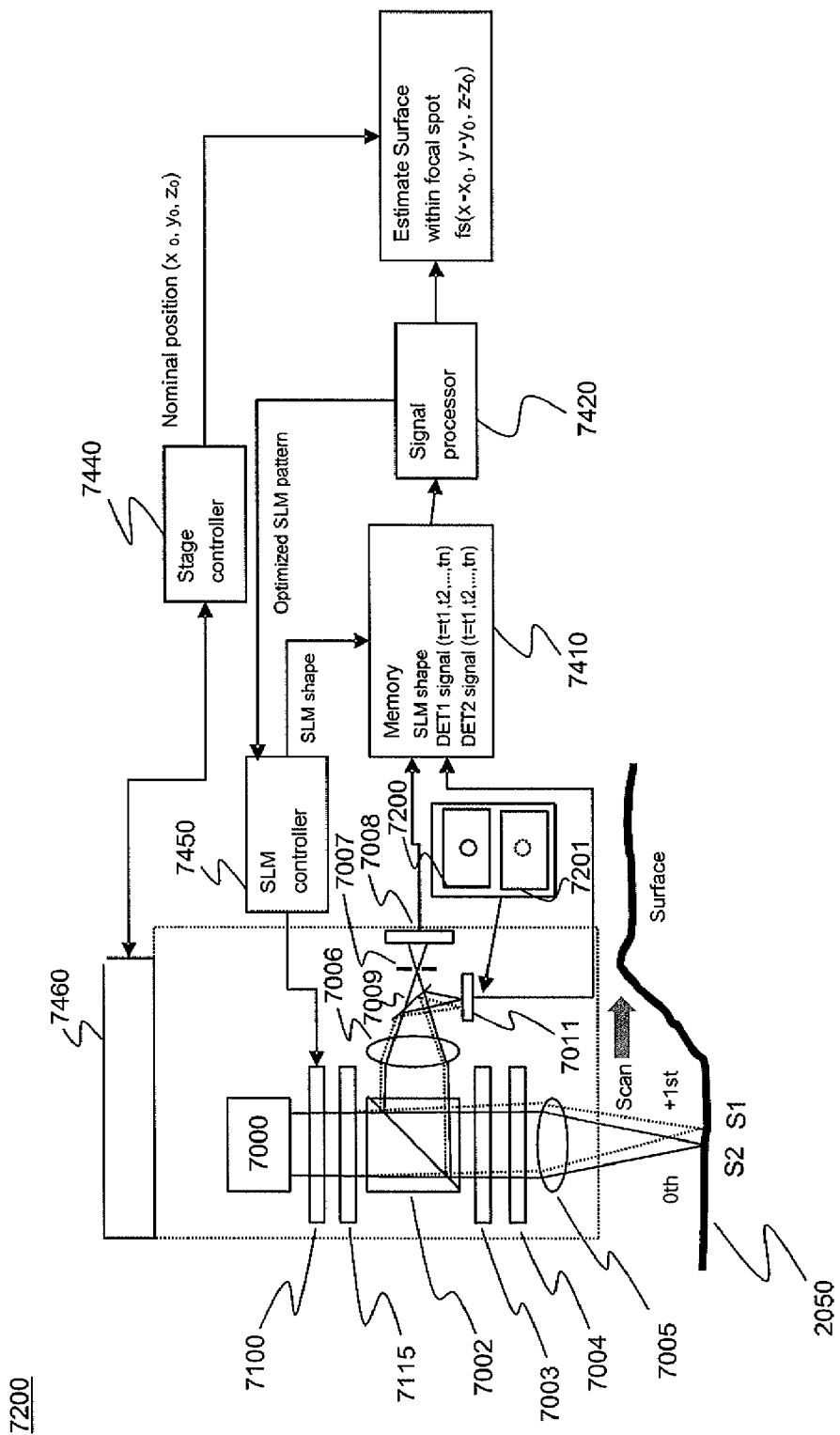
FIG. 25 illustrates a non-contact optical surface profiler.

FIG. 25 is a diagram of a non-contact optical surface profiler 7200. Light emitted from an optical source 7000, such as a laser diode, is divided to 0th, +1st and −1st order lights by a diffraction grating 7115. The +1st and 0th order lights are detected by detectors 7201 and 7200, respectively. The +1st order and 0th order lights can be corresponding to the first scanning spot S1 and the second scanning spot S2. A SLM (spatial light modulator) 7100 has a vortex like phase pattern whose phase changes from 0 to 2π as illustrated in FIG. 14A.

A spot shape on the object surface 2050 becomes a donut shape pattern as shown in FIG. 14B. When a first scanning spot S1 using +1st order light located at an edge of the step, the detector image of the detecting region 7201 becomes one shown in FIGS. 15A, 15B, or 15C. As shown in the figures, the detector image has two peaks of intensity, and the line connecting two peaks of detector image is perpendicular to the first direction where the step extends.

After the first direction which is perpendicular to the line connecting two peaks of detector image is calculated in the signal processor 7420 from the detector signal of the detector 7201, the signal processor 7420 computes the optimum SLM pattern. The SLM pattern becomes the pattern shown in FIG. 18, and the phase regions are divided by the first direction corresponding to α. Then SLM controller 7450 controls the SLM pattern of the SLM 7100 in FIG. 25. After that, the second scanning spot S2 becomes the spot corresponding to α as shown in FIG. 19. In this condition, 0th order light is used as the second scanning spot S2, and this spot has two peaks of intensity. Then the detector image of the detector region is also shown in FIG. 20. As described in the second embodiment, a measurement of the object surface is executed using the second scanning spot S2. In FIG. 25, a PBS 7002, a QWP 7003, a focus shift device 7004, focusing lenses 7005 and 7006, a pinhole board 7007, a beam splitter 7009, detectors 7008 and 7011, a memory 7410, a stage controller 7440, and a stage 7460 are illustrated.

While embodiments according to the present invention have been described with reference to exemplary embodiments, it is to be understood that the present invention is not limited to the above described embodiments. The scope of the following claims is to be accorded the broadest interpretation so as to encompass all such modifications and equivalent structures and functions.

What is claimed is:

1. A method for measuring a surface profile of an object, the method comprising:
   acquiring information about a first direction where a step of a surface of the object extends relative to a scanning direction;
   changing a direction of a boundary of a first region and a second region in an optical element based on the acquired information, the optical element applying a first phase to a first portion of an irradiation beam passing through the first region and a second phase to a second portion of the irradiation beam passing through the second region among irradiation beams being irradiated to the object; and
   scanning the object in the scanning direction with the irradiation beam.

2. The method according to claim 1, wherein the information is acquired by using the irradiation beam having phase distribution.

3. The method according to claim 1, wherein the information is acquired by using the irradiation beam having circumferential phase distribution from 0 to $2\pi$.

4. The method according to claim 1, wherein applying a phase is performed by using a spatial light modulator.

5. The method according to claim 1, wherein the irradiation beam has phase distribution in accordance with the first direction where the step of the surface of the object extends.

6. The method according to claim 1, wherein the phase distribution is composed of a region where a phase of pi is applied, and a region where no phase is applied.

7. The method according to claim 1, wherein the irradiation beam forms two peaks in intensity on the surface of the object.

8. The method according to claim 7, wherein the irradiation beam has the phase distribution so that a second direction perpendicular to a line connecting between two points of the two peaks is equal to the first direction where the step of the surface of the object extends.

9. The method according to claim 1, wherein the scanning direction is a direction where the irradiation beam moves relative to the surface of the object.

10. The method according to claim 1, wherein the setting is performed such that the direction of the boundary is along a direction where a step of a surface of the object extends.

11. The method according to claim 1,
    wherein the irradiation beam is focused on the surface of the object.

12. The method according to claim 1,
    wherein an irradiation position on the object upon acquiring the information and an irradiation position on the object upon changing the direction of the boundary are different.

13. An apparatus for measuring a surface profile of an object, the apparatus comprising:
    an optical source;
    a spatial light modulator comprising an optical element having a first region to apply a first phase to an irradiation beam from an optical source and a second region to apply a second phase different from the first phase to the irradiation beam and the second region being located opposite from the first region across a boundary;
    a scanning unit configured to scan the object;
    a detector configured to detect a reflected light from the object; and
    a controller configured to change a direction of the boundary according to a first direction where a step of a surface of the object extends relative to a scanning direction of the scanning unit.

14. The apparatus according to claim 13, wherein the controller controls the spatial light modulator so that the phase distribution has two regions with a boundary, and a direction of the boundary corresponds to the first direction.

15. The apparatus according to claim 13, comprising a first optical probe including the optical source, the detector, and the controller, and a second optical probe including another optical source, another detector, and another controller.

16. The apparatus according to claim 13,
    wherein a beam spot is formed on a position on the object upon the scanning, is different from a position of a beam spot formed upon acquiring the first direction where a step of a surface of the object extends relative to a scanning direction of the scanning unit.

* * * * *